United States Patent [19]

Hozman et al.

[11] 4,290,676

[45] Sep. 22, 1981

[54] PRESSURE MEMBER URGING MECHANISM

[75] Inventors: Nelson D. Hozman; Robert L. Reynolds; Thomas G. Kirn, all of Rochester, N.Y.

[73] Assignee: Eastman Kodak Company, Rochester, N.Y.

[21] Appl. No.: 69,678

[22] Filed: Aug. 27, 1979

Related U.S. Application Data

[63] Continuation-in-part of Ser. No. 31,266, Apr. 18, 1979, abandoned.

[51] Int. Cl.³ .......................... G03B 1/00; G03B 17/00
[52] U.S. Cl. ...................................... 354/121; 354/203
[58] Field of Search ............... 354/121, 203, 275, 276; 352/221, 225, 227; 355/72; 250/480

[56] References Cited

U.S. PATENT DOCUMENTS

| | | |
|---|---|---|
| 421,923 | 2/1890 | Good . |
| 1,829,332 | 10/1931 | Beck . |
| 1,872,353 | 8/1932 | Schulz ................................ 352/221 |
| 1,987,254 | 1/1935 | Goldhammer . |
| 2,753,777 | 7/1956 | Faulhaber et al. . |
| 3,311,037 | 3/1967 | Winkler et al. . |
| 3,563,144 | 2/1971 | Fukino . |
| 3,707,904 | 1/1973 | Engelsmann et al. . |
| 3,754,460 | 8/1973 | Tanaka ................................ 354/203 |

FOREIGN PATENT DOCUMENTS

2809856 9/1978 Fed. Rep. of Germany .

*Primary Examiner*—John Gonzales
*Attorney, Agent, or Firm*—R. A. Fields

[57] ABSTRACT

In a camera, a pressure plate is urged against a film frame to hold the film frame in the focal plane of a picture-taking lens during exposure. A resiliently flexible strip, mounted on a loading door of the camera, is normally disposed in a storage plane. An actuating pin, which engages the flexible strip when the loading door is closed, connects the strip to camera mechanism, such as a shutter release. The actuating pin operates, in response to movement of the shutter release, to partially bow an intermediate portion of the strip from the storage plane by sliding a first portion of the strip in the storage plane toward a second, stationary portion of the strip. Bowing of the strip moves the intermediate portion toward the exposure plane to urge the pressure plate against the film frame before exposure and establishes a resilient force in the bowed portion for returning the strip to the storage plane after exposure.

8 Claims, 5 Drawing Figures

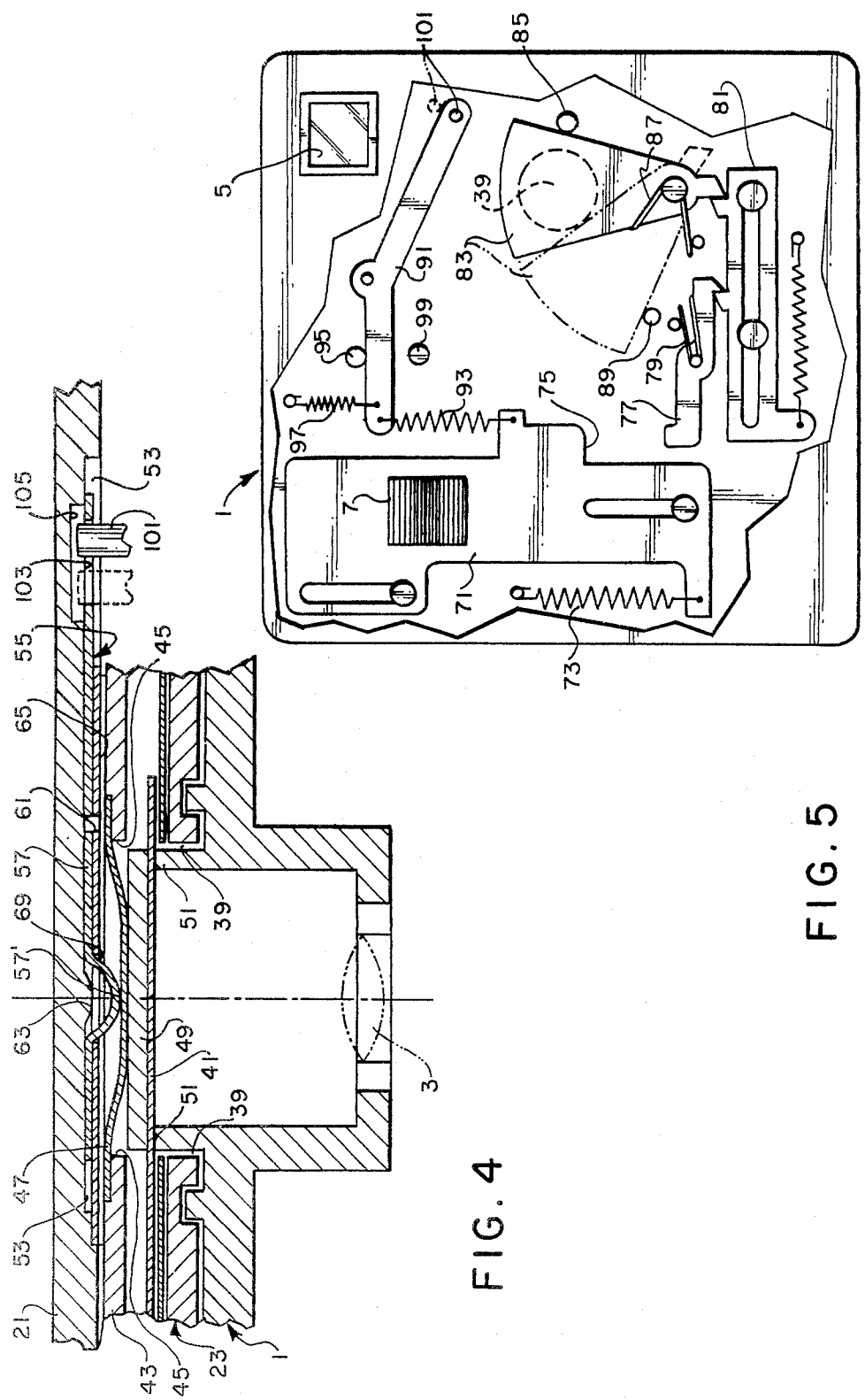

PRESSURE MEMBER URGING MECHANISM

This application is a continuation-in-part of U.S. Pat. application Ser. No. 31,266, now abandoned.

CROSS REFERENCE TO RELATED APPLICATIONS

Reference is made to commonly assigned, copending U.S. patent application Ser. No. 931,053, now U.S. Pat. No. 4,194,822 entitled PHOTOGRAPHIC FILM CARTRIDGE ASSEMBLY AND CAMERA, filed in the name of G. S. Sethi on Aug. 4, 1978 and U.S. patent application Ser. No. 931,076, now U.S. Pat. No. 4,202,614, entitled PHOTOGRAPHIC CAMERA, filed in the name of D. M. Harvey on Aug. 4, 1978. The Harvey application is a continuation of U.S. patent application Ser. No. 774,715 filed on Mar. 7, 1977, now abandoned.

BACKGROUND OF THE INVENTION

1. Field of the Invention

The present invention relates to photographic apparatus, in general, and more particularly to a mechanism for urging a pressure member against a photographic film to locate an exposure area of the film in an exposure plane.

2. Description of the Prior Art

It is well known in still picture cameras that when a film frame is moved during exposure or does not lie substantially flat in the focal plane of the picture-taking lens, the resulting picture will be blurred or distorted. For this reason, there is usually provided a pressure-applying assembly for securely holding the film frame in the focal plane of the lens during exposure. Such pressure-applying assemblies are known in a wide variety of constructions. However, the known constructions suffer from several disadvantages. For example, many pressure plates are mounted on a loading door or a removable rear wall of the camera, the pressure plate being urged by a compression or leaf spring to bear against the film, as in U.S. Pat. Nos. 3,311,037 and 3,707,904 and in the above-referenced Harvey patent applications (which are generally described in Publication No. 172,108 of Research Disclosure, Aug. 1978, Number 172.) Because in most constructions, the pressure plate and the spring protrude from the loading door, they are accessible to damage or deforming during the time the loading door is opened. Moreover, such an arrangement usually adds to the front-to-back dimension of the camera, which makes it difficult to design a camera that is relatively thin, such as a pocket-size or miniature camera.

Another type of pressure-applying assembly, as in U.S. Pat. No. 1,829,332, includes a cam mechanism which is actuated by movement of a shutter operating mechanism to hold a pressure plate firmly against the film. Here, the cam urging of the pressure plate is not resilient, as in the example of the spring-urged pressure plate, and may require substantially more front-to-back spacing in the camera than the spring-operated version.

A number of spring-operated and cam-operated pressure-applying assemblies have been devised in which a pressure member is relievable with respect to the film, as in the above-referenced Harvey patent applications and U.S. Pat. No. 1,829,332. That is, the pressure member is retracted from the filmstrip after exposure to permit film advance. Such relievable pressure-applying assemblies, in addition to suffering from the problems described above, are relatively more complex and expensive than the non-relievable types.

SUMMARY OF THE INVENTION

The above-described problems associated with prior art pressure-applying assemblies are believed solved by the present invention. Specifically, according to the present invention, a mechanism for urging a pressure member is provided which is relatively simple, economical to manufacture, and has a spring-like member that is stored in a substantially flat configuration. The substantially flat storage facilitates design of a camera which is relatively thin and minimizes the possibility of any damage to the spring-like member during the time that it is accessible, such as when a loading door of the camera is opened.

In keeping with the teachings of the present invention, there is generally provided a mechanism for urging a pressure member against a photographic film to locate an exposure area of the film in an exposure plane, which mechanism comprises:

a strip member having first and second portions spaced from each other and a flexible urging portion between said first and second portions, said strip member being adjustable to one configuration in which said first and second portions are separated by a given distance at which said urging portion is ineffective to urge the pressure member against the film and another configuration in which said first and second portions are separated by a lesser distance at which said urging portion is bowed toward the exposure plane to urge the pressure member against the film; and means for engaging said first portion and moving it with respect to said second portion to change the spacing between said portions for adjusting said strip member from one of its two configurations to the other.

According to a preferred embodiment of the present invention, the strip member is substantially flat and constructed of a resiliently flexible material, such as "Mylar" which is a registered trademark of DuPont. The flat strip is mounted on a loading door of the camera and is normally disposed in a storage plane, defined by a recess in the loading door. Such an arrangement facilitates design of a camera which is relatively thin and makes the strip substantially inaccessible to damage when the loading door is opened. an actuating pin, which engages the strip when the loading door is closed, connects the strip to means for effecting a camera function, such as a shutter release member. The actuating pin operates, in response to initiation of shutter release, to partially bow an intermediate portion of the strip outwardly from the storage plane by moving a first portion of the strip in the storage plane toward a second, stationary portion of the strip. The bowed portion of the strip moves toward the exposure plane to urge the pressure member against the photographic film before film exposure and resiliently returns the strip to the storage plane after film exposure.

BRIEF DESCRIPTION OF THE DRAWINGS

For a more complete understanding of the present invention, reference should be had to the following detailed description of the invention taken in conjunction with the accompanying drawings in which:

FIG. 4 is a section view of the pressure plate urging mechanism during operation preparatory to film exposure; and FIG. 5 is an elevation view of a shutter operating mechanism in the camera, which moves an actuating pin to operate the pressure plate urging mechanism.

DESCRIPTION OF THE PREFERRED EMBODIMENT

Figure 1:
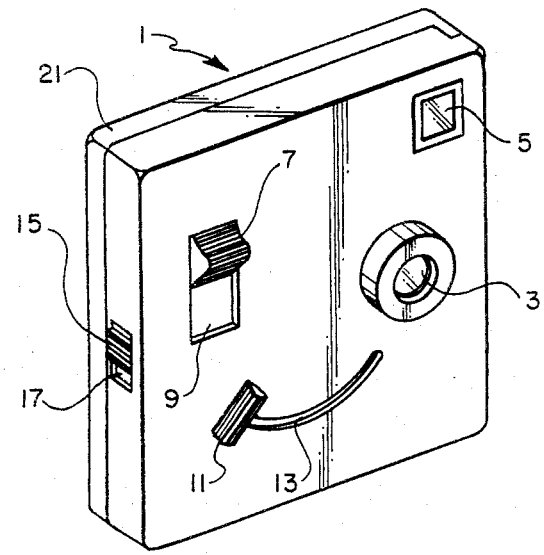
FIG. 1 is a front perspective view of a still picture camera which is similar in certain respects to the camera disclosed in the above-referenced Sethi patent application.
Figure 2:
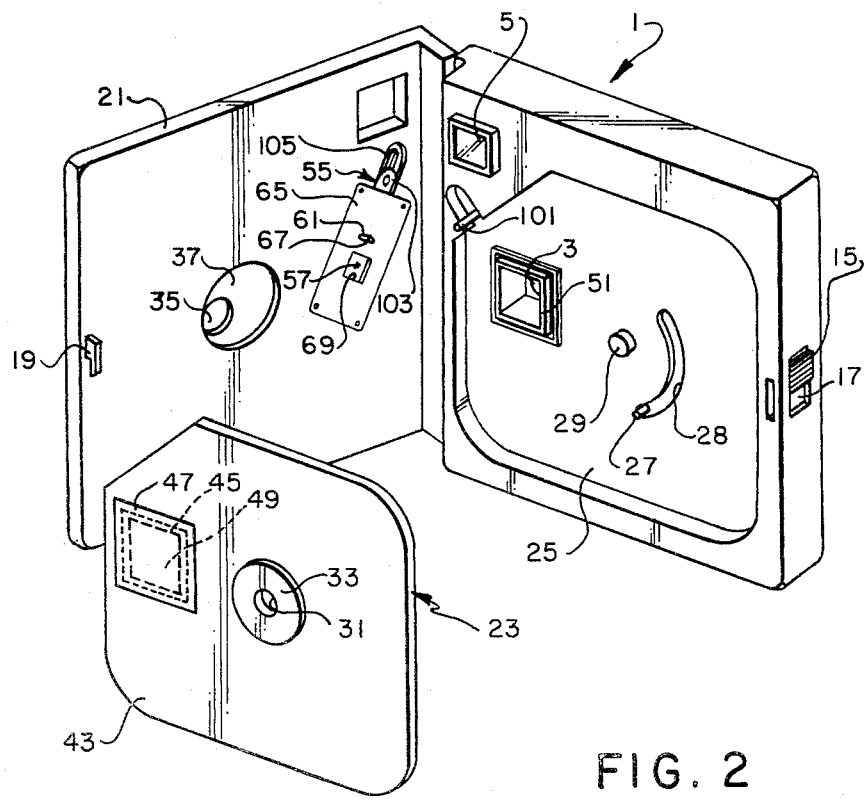
FIG. 2 is a rear perspective view of the still picture camera and of a film cartridge, which shows the camera rear opened for receiving the cartridge.

Referring now to the drawings and in particular to FIG. 1, there is shown a still-picture camera which is similar in certain respects to the camera disclosed in the above-referenced Sethi patent application. At the front of the camera 1 there is provided a picture-taking lens 3, a view-finder 5, a shutter release button 7, movable along a straight slot 9, and a film advance tab 11, movable along an arcuate slot 13. A locking tab 15 at one side of the camera 1 is movable along a straight slot 17 to disengage, in FIG. 2, from an internal latch 19, located on a rear door 21 of the camera. This allows the rear door 21 to be opened for loading a film cartridge 23 into a receiving chamber 25 of the camera. The chamber 25 is sized and shaped to receive the cartridge 23 only in one specific orientation, as shown in FIG. 2. When the cartridge 23 is received in the chamber 25, a pin 27, coupled to the film advance tab 11 and extending from an arcuate slot 28, engages film drive means (not shown) in the cartridge. Moreover, a stationary post 29, projecting into the camera chamber 25, extends into a central opening 31 in a core portion 33 of the received cartridge. When the loading door 21 is closed, exposure numbers on the cartridge core 33 are individually viewable through a window 35 in the door and the cartridge core is received in a cavity 37 which overlaps the window.

The film cartridge 23, as shown in FIG. 4, includes a rectangular exposure window 39 which is optically aligned with the picture-taking lens 3 upon receipt of the film cartridge in the camera chamber 25. A film disk 41 in the cartridge 23 can be rotated incrementally about the stationary post 29 in the camera chamber 25, in FIG. 2. This moves successive exposure areas of the film disk 41 into alignment with the exposure window 39, as in FIG. 4. The film disk 41 is rotated by pushing the film advance tab 11 along the arcuate slot 13, in FIG. 1. The pushed tab 11 moves the pin 27 along the arcuate slot 28, in FIG. 2, which operates film drive means (not shown) in the cartridge 23.

A rear wall 43 of the cartridge 23 has a rectangular opening 45, shown aligned with the exposure window 39 in FIG. 4. The opening 45 is covered by an opaque resiliently flexible membrane 47 which is bonded to the rear wall 43, as in FIGS. 2 and 4. A rigid pressure plate 49 is normally disposed within the wall opening 45, substantially parallel to and spaced from the film disk 41. The pressure plate 49 is fixed to the flexible membrane 47. Upon bowing of the flexible membrane 47 partially into the wall opening 45, as in FIG. 4, the pressure plate 49 is pushed by the flexible membrane partially out of the wall opening and is brought to bear against the film disk 41. The pressure plate 49, in bearing against the film disk 41, presses the film disk into contact with a rectangular rail 51, projecting from the camera chamber 25 into the exposure window 39; whereupon, an exposure area of the film disk 41 is held substantially flat in an exposure plane coincident with the focal plane of the picture-taking lens 3.

Figure 3:
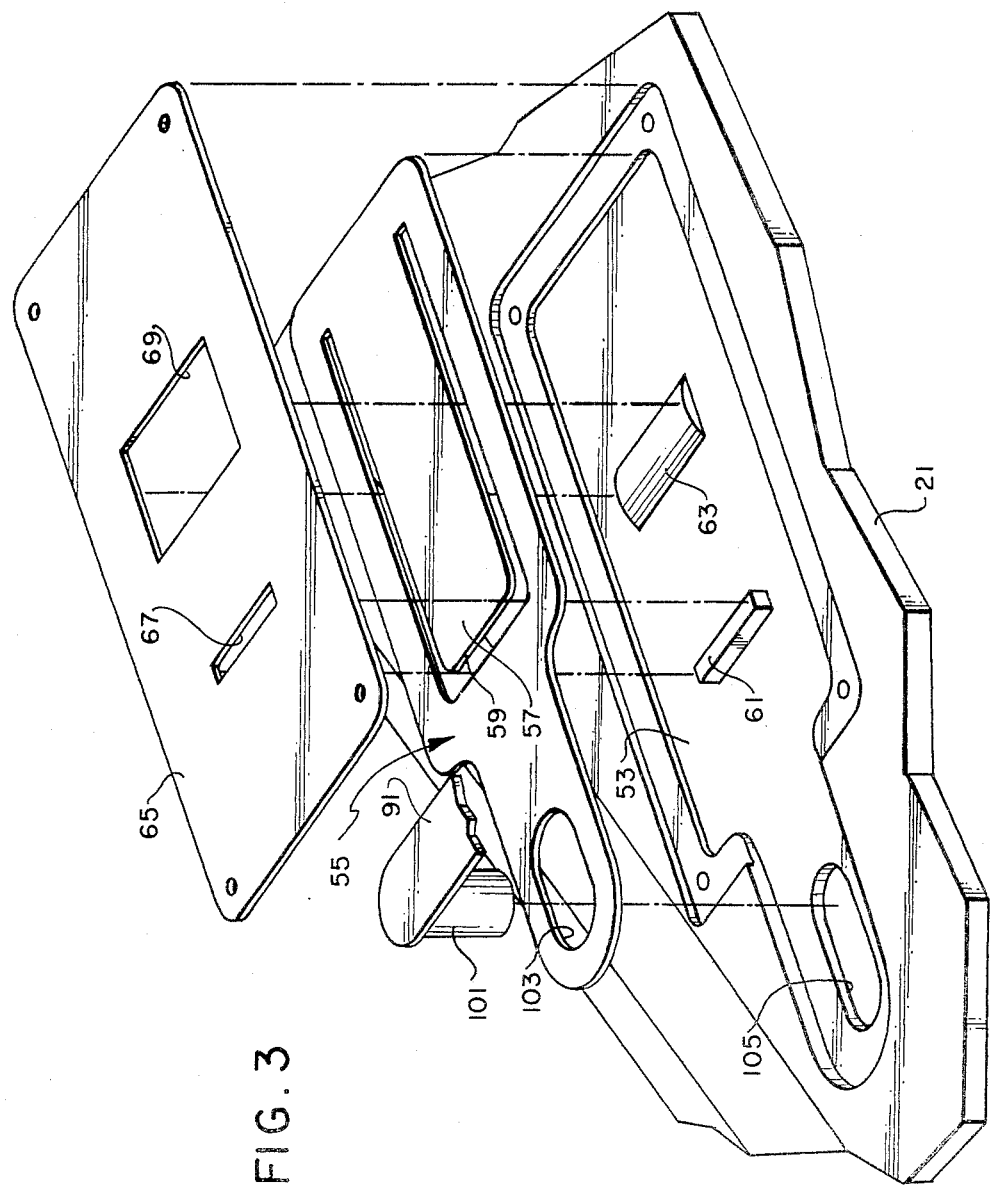
FIG. 3 is an exploded perspective view of a mechanism in the camera for urging a pressure plate in the cartridge against the film, according to a preferred embodiment of the present invention.

The preferred embodiment of the present invention, which is a mechanism for urging the pressure plate 49 against the film disk 41 by bowing the flexible membrane 47, is not clearly shown in FIG. 3. The loading door 21 of the camera 1 includes a recess or relieved area 53 which defines a storage plane for a pressure plate urging member 55. The pressure plate urging member 55, preferably is in the form of a substantially flat strip, constructed of a resiliently flexible material, such as "Mylar", and includes a tongue 57. The tongue 57 has forward or leading end 59 which abuts against a stop 61, fixed to the loading door 21 in the recess 53. When the pressure plate urging member 55 is moved generally to the left, in FIG. 3, in the storage plane defined by the recess 53, the leading end 59 of the tongue 57 is held stationary, which causes an intermediate portion 57' of the tongue to flex and bow out of the recess, as in FIG. 4. A slight hump 63 may be provided in the recess 53 beneath the intermediate or bowed portion 57' to facilitate such bowing of the tongue 57. When the pressure plate urging member 55 is moved generally to the right, in FIG. 3 (or in FIG. 4, generally to the left) the bowed portion 57' of the tongue 57 substantially straightens, moving back into the storage plane defined by the recess 53. Bowing of the tongue establishes a resilient or spring-like force in the bowed portion which may be used to return the pressure plate urging member generally to the right, in FIG. 3. The apparatus for moving the pressure plate urging member generally to the left, in FIG. 3, is described below and shown in FIG. 5.

A constraining plate 65, having one opening 67 into which the stop 61 protrudes and another opening 69 through which the bowed portion of the tongue 57 protrudes, is secured to the loading door 21, over the pressure plate urging member 55. When the pressure plate urging member 55 is moved generally to the left, in FIG. 3, in the storage plane defined by the recess 53, the constraining plate 65 maintains the pressure plate urging member in the storage plane, except for the bowed portion 57' of the tongue 57 which moves through the opening 69 in the constraining plate, as in FIG. 4.

Viewing FIG. 4, the bowed portion 57' of the tongue 57 applies a resilient force to the flexible membrane 47, bonded to the rear wall 43 of the film cartridge 23. The resilient force moves the flexible membrane 47 partially into the wall opening 45, which moves the pressure plate 49, fixed to the flexible membrane, partially out of the wall opening. The moved plate 49 is urged by the resilient force of the bowed portion 57' against the film disk 41 to press the film disk into contact with the camera rail 51, projecting into the exposure window 39 of the film cartridge 23; whereupon, the pressed disk 41 is held substantially flat in the focal plane of the picture-taking lens 3 for exposure.

Referring now to FIG. 5, there is shown a shutter operating mechanism in the camera 1. When the shutter release button 7 is pushed downward, in FIG. 5, a slide 71, fixed to the button, is similarly moved against the reverse urging of a return spring 73. An extended edge 75 of the moved slide 71 pivots a restraining latch 77 in a counterclockwise direction against the reverse urging of a return spring 79. The pivoted latch 77 releases a spring-urged striker 81 which moves to the right, in FIG. 5 to strike a rebound-type shutter blade 83, normally held against a stop 85 by a return spring 87. The shutter blade 83 pivots in a counterclockwise direction, first uncovering the exposure window 39 of the cartridge 23 to inititate an exposure interval and then rebounding off a stop 89 to terminate the exposure interval by again covering the exposure window. Subsequent operation of the film advance tab 11, in FIG. 1, serves to recock the striker 81 for the next actuation of the shutter blade 83. Conventional double exposure prevention means, although not shown, are provided to insure that the shutter release button 7 cannot be pushed downward in FIG. 5, following exposure termination, until film advance is completed. The slide 71, in FIG. 5, is connected to a pivotally mounted arm 91 by a coupling spring 93. The arm 91 is normally held against a stop 95 by a return spring 97 which is weaker than the coupling spring 93. When the slide 71 is initially moved downward, in FIG. 5, for effecting shutter actuation, the arm 91 is pivoted in a counterclockwise direction until halted by a stop 99. An actuating pin 101, located on the pivoted arm 91, projects, as shown in FIGS. 3 and 4, loosely through an elongate opening 103 in the pressure plate urging member 55 and into a channel 105 in the recess 53 in the loading door 21. As a result, the actuating pin 101 on the pivoted arm 91 operates to move the pressure plate urging member 55 generally to the left, in FIG. 3 (or in FIG. 4, generally to the right) to bow the tongue 57 through the opening 69 in the constraining plate 65. The bowed portion 57' of the tongue 57, in FIG. 4, urges the pressure plate 49 against the film disk 41 to hold the film disk substantially flat in the focal plan of the picture-taking lens 3 before the exposure interval begins. After termination of the exposure interval and return of the slide 71, as in FIG. 5, the arm 91 is pivoted in a clockwise direction by the return spring 97 from the stop 99 to the stop 95. The actuating pin 101 on the pivoted arm 91 moves generally to the left, in FIG. 4, along the elongate opening 103 in the pressure plate urging member 55. This releases the pressure plate urging member 55 for movement generally to the left, in FIG. 4, by the resilient force established in the bowed portion 57' of the tongue 57; whereupon, the tongue 57 substantially flattens in the recess 53, freeing the flexible membrane 47. The flexible membrane 47 returns from the bowed configuration to a substantially straight configuration, drawing the pressure plate 49 away from the film disk 41 to allow the film disk to be advanced across the exposure window 39 for the next exposure.

Although the actuating pin 101 is shown in FIGS. 3 and 4 as fitting loosely through the elongate opening 103 in the pressure plate urging member 55, it will be appreciated that a tight fit could be devised; in which instance, the actuating pin (rather than the resilient force established in the bowed portion of the tongue 57) would be used to move the pressure plate urging member to substantially flatten it in the recess 53.

When the loading door 21 is opened to remove the film cartridge 23 from the camera chamber 25, the channel 105 in the loading door and the opening 103 in the pressure plate urging member 55 are separated from the actuating pin 101. Closing the loading door 21 again couples the actuating pin 101 and the pressure plate urging member 55.

The present invention has been described in detail with particular reference to the preferred embodiment thereof, but it will be understood that variations and modifications can be effected within the spirit and scope of the invention. For example, the pressure plate urging member 55 could be located in the film cartridge 23 instead of in the loading door 21 of the camera 1. Alternatively, the pressure plate 49 could be located in the camera instead of in the wall opening 45 of the film cartridge. According to another example, the tongue 57 of the pressure plate urging member 55 could normally be in the bowed configuration instead of in the substantially flat configuration; in which instance, the tongue would be substantially flattened only in anticipation of film advance and immediately after film advance (but before film exposure) would return to its normal bowed configuration.

We claim:

1. Mechanism for urging a pressure member against a photographic film to locate an exposure area of the film in an exposure plane, said mechanism comprising:

a strip member having first and second portions spaced from each other and a flexible urging portion between said first and second portions, said strip member being adjustable to one configuration in which said first and second portions are separated by a given distance at which said urging portion is ineffective to urge the pressure member against the film and another configuration in which said first and second portions are separated by a lesser distance at which said urging portion is bowed toward the exposure plane to urge the pressure member against the film; and means for engaging said first portion and moving it with respect to said second portion to change the spacing between said portions for adjusting said strip member from one of said two configurations to the other.

2. Mechanism for urging a pressure member against a photographic film to locate an exposure area of the film in an exposure plane, said mechanism comprising:

a strip member having first and second portions spaced from each other and a bowable urging portion between said first and second portions, said strip member being adjustable to a normal configuration in which said first and second portions are separated by a given distance at which said urging portion is substantially flat and an urging configuration in which said first and second portions are separated by a lesser distance at which said urging portion is bowed toward the exposure plane to urge the pressure member against the film; and means for engaging said first portion and moving it toward said second portion to reduce the spacing between said two portions for adjusting said strip member from said normal configuration to said urging configuration.

3. Mechanism for urging a pressure member against a photographic film to locate an exposure area of the film in an exposure plane, said mechanism comprising:

a strip member having first and second substantially flat portions disposed in a storage plane in spaced relation and a bowable urging portion between said first and second portions; and means moving said first portion in the storage plane toward said second portion for bowing said urging portion toward the exposure plane to urge the pressure member against the film.

4. Mechanism as recited in claim 3, wherein said moving and bowing means includes an actuating member, engagable with said first portion of said strip member, and means supporting said actuating member for movement substantially parallel to the storage plane.

5. Mechanism for urging a pressure member against a photographic film to locate an exposure area of the film in an exposure plane, said mechanism comprising:
a strip member having first and second substantially flat portions disposed in a storage plane in spaced relation and a resilient bowable urging portion between said first and second portions and which, when bowed, tends to straighten;
means for constraining said first and second portions in the storage plane;
means for moving said first portion in the storage plane toward said second portion, for bowing said urging portion toward the exposure plane to urge the pressure member against the film, and for releasing said urging portion to move said first portion in the storage plane away from said second portion by straightening .

6. Mechanism as recited in claim 5, wherein said constraining means includes means defining an opening through which said urging portion is bowed as said first portion is moved in the storage plane toward said second portion.

7. Mechanism for urging a pressure member against a photographic film to locate an exposure area of the film in an exposure plane of a camera, said mechanism comprising:
a strip member having a movable portion and a stationary portion disposed in a storage plane in spaced relation and a bowable urging portion between said movable and stationary portions;
a loading door movable to open and close the camera for film loading an defining the storage plane for said strip member;
means located on said loading door for constraining said movable and stationary portions in the storage plane, though not constraining said urging portion;
means operable for effecting a camera function;
means, responsive to closing of said loading door, for coupling said strip member and said camera function effecting means; and
means, responsive to operation of said camera function effecting means, for moving said coupling means parallel to the storage plane and moving said movable portion in the storage plane toward said stationary portion for bowing said urging portion toward the exposure plane to urge the pressure member against the film.

8. Mechanism as recited in claim 7, wherein said loading door includes a relieved area in which said movable, stationary and urging portions of said strip member are normally disposed, and wherein said constraining means includes means for maintaining said movable and stationary portions in said relieved area, though allowing said urging portion to bow out of said relieved area to urge the pressure member against the film.

* * * * *

UNITED STATES PATENT OFFICE
CERTIFICATE OF CORRECTION

PATENT NO. : 4,290,676
DATED : September 22, 1981
INVENTOR(S) : Nelson D. Hozman; Robert L. Reynolds, Thomas G. Kirn It is certified that error appears in the above-identified patent and that said Letters Patent are hereby corrected as shown below:

Column 8, Line 8, the word "an" is to be changed to the word --and--.

Signed and Sealed this

First Day of December 1981

[SEAL]

Attest:

GERALD J. MOSSINGHOFF

*Attesting Officer*   *Commissioner of Patents and Trademarks*